Sept. 7, 1954 L. BROCK 2,688,430
FOOD PLATTER
Filed March 24, 1947
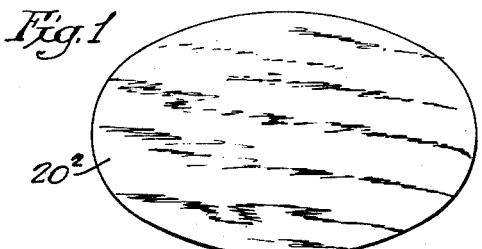
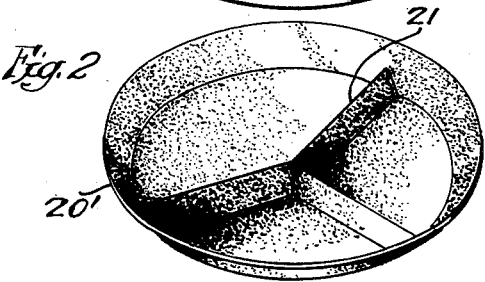
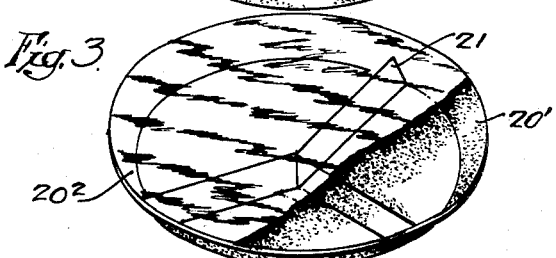
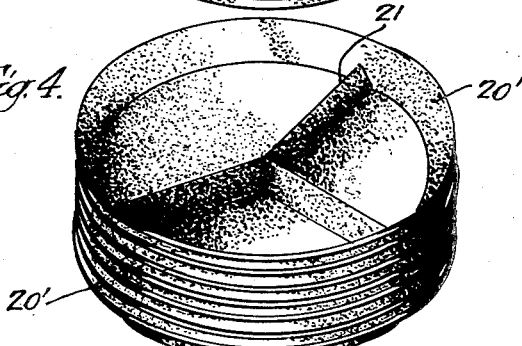
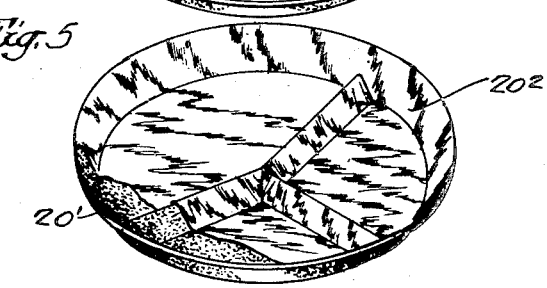
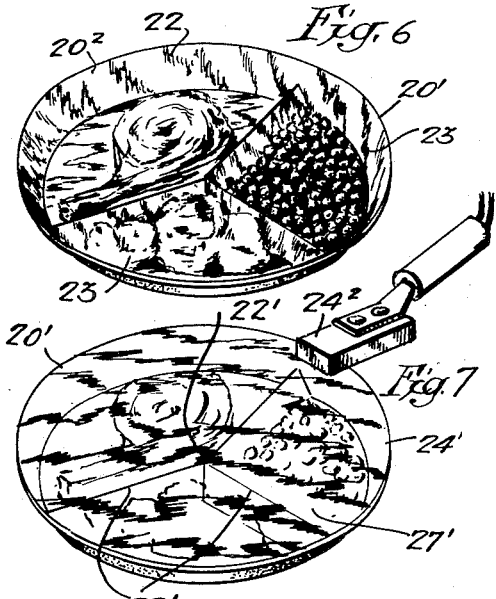
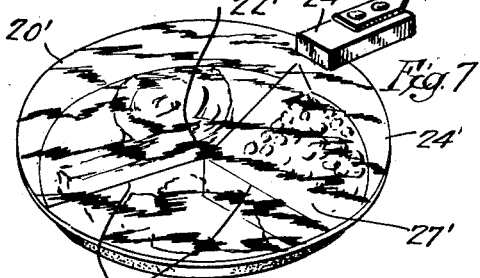
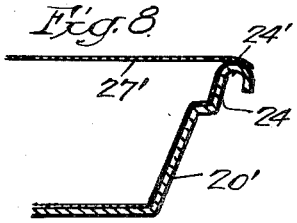

Patented Sept. 7, 1954

2,688,430

UNITED STATES PATENT OFFICE 2,688,430

FOOD PLATTER

Lynmar Brock, Philadelphia, Pa.

Application March 24, 1947, Serial No. 736,860

2 Claims. (Cl. 229—14)

My invention relates to containers for handling partially cooked or fully cooked food.

A purpose of my invention is to provide a container into which food for further cooking may be placed after which the container is covered and the cover sealed.

A further purpose is to provide individual units in a container in which each different serving for a course may be placed and to provide a cover for the container which is sealed to the container.

A further purpose is to place a heat or otherwise sealable sheet in a platter, serve partially or fully cooked food in the platter on such sheet, seal a cover over the food to such heat or otherwise lacquered or sealable sheet, and cook the food in a closed environment formed by such sheets sealed together.

A further purpose is to place a heat or otherwise sealable sheet in a platter, serve partially or fully cooked food in the platter on such sheet, and seal a cover over the food.

Further purposes will appear in the specification and in the claims.

In the drawings I have shown one form only of my invention with some slight variations of structure.

Figure 1 is a perspective view of my platter liner.

Figure 2 is a perspective view of my improved platter.

Figure 3 is a fragmentary perspective view of my improved platter with the liner in place upon the platter and the liner partly broken away to show the interior of the platter.

Figure 4 is a perspective view showing the individual platters in stacked position.

Figure 5 is a perspective view with the liner pressed into position to conform with the shape of the platter.

Figure 6 is a perspective view of the platter showing different kinds of food in different compartments.

Figure 7 is a perspective view of the platter with a cover upon the platter enclosing the food and illustrating an electric heating unit to seal the cover to the platter.

Figure 8 is a sectional elevation of my platter showing the liner in place in the container and a cover in place upon the container and the liner and sealed thereto.

In the drawings like numerals refer to like parts.

Describing in illustration but not in limitation and referring to the drawings:

Particularly in connection with industrial plants, a serious problem is presented in serving hot food of high quality. Many plants are not of suitable size or layout to make operation of a conventional restaurant practical. In other cases the locations at which food service is desirable are so numerous that transportation of food from a central kitchen and maintaining of food in palatable condition presents serious difficulties.

In a co-pending application, now abandoned Serial No. 642,455, filed January 21, 1946, for Process and Apparatus for Preparing and Dispensing Food, which co-pending application constitutes a parent application to the present one I have stated that the food is partially cooked by conventional methods at a kitchen, then served in individual packages such as platters or the like in individual servings of various foods making up the course (in some cases the meal may have only one course), and finally distributed on the platters to the point of serving and there heated up and finally cooked. The partial cooking will ordinarily be in bulk but this may not always be the case.

In my co-pending application Serial No. 642,455 I have stated that the food in the first instance will be received and prepared. It then can be refrigerated prior to partial cooking although this step may in some cases be omitted. The prepared food will next be cooked to a partial extent. By this it is meant that a batch of vegetables will be cooked together, under the conditions suitable for cooking vegetables, whereas a cut of meat will be cooked independently under conditions for cooking meat. The same will apply to the other components of the meal.

After the initial cooking, the food is served in individual servings on platters or on containers of other suitable type. Thus if the course is to consist of meat and two vegetables the platter will receive at this stage an individual serving of partially cooked meat and individual servings of two partially cooked vegetables. Other combinations may of course be employed.

In some instances it may be desirable to wholly cook the food before it is placed into my improved container.

After the food is placed in the platter a cover may be placed upon the top of the platter to cover the contents of the platter, after which the cover will be sealed to the platter.

The food in the platter is then sent to its place of consumption, which may be a restaurant or a factory. It can be heated before serving to the user.

In Figures 1 to 8 inclusive I illustrate a form of platter 20' (Figure 2) suitably made of cardboard, and having partitions 21, separating a compartment 22 for meat (Figure 6) from compartments 23 suitable for vegetables. A properly circular liner 20² (Figure 1) suitably of transparent heat sealable cellophane sheet such as cellulose acetate (but permissibly of otherwise sealable sheets such as regenerated cellulose or cellulose hydrate) is placed over the platter, roughly conforming to the shape of the rim and partitions as shown in Figure 3. If the cooking temperature will be high enough to damage any plastic, care will be taken to be sure that the plastic or plastic adhesive used will withstand the temperature of cooking. To better form the liners 20² to the platters, a stack of platters with liners is formed as shown in Figure 4, resulting in pressing and folding the liners rather neatly to the contour of the platters to produce the result shown in Figure 5.

The platter provided with the liner is served with food as shown in Figure 6 here consisting of meat in one compartment 22, and a vegetable in each of compartments 23.

A cover sheet 27', desirably of the same transparent heat or otherwise sealable sheet material as the liner 20², is placed over the platter and sealed to the liner around the rim at 24' and also along the line of each partition from the rim to the center at 22'. Thus each compartment is sealed from the outside by the circumferential seal line and from each other compartment by three (or any suitable number of) radial seal lines between the liner sheet and the cover sheet.

If heat sealable material is used for the sheets, an electric iron 24² may be used to make the seals. With sheets of other types, it may be necessary to prepare the cover sheet, as with an adhesive coating or the like. In some cases the sheets may have a thermoplastic coating, in which case they can be sealed as shown in Figure 7.

When the final cooking of the food takes place, the seals and the water resisting character of the sheets serve to retain all moisture, flavor and juice, and prevent mingling of juices or vapors from different foods. This feature is very desirable except in the case of an item like French fried potatoes, in which case the cover sheet will be desirably punctured before cooking.

In view of my invention and disclosure variations and modifications to meet individual whim or particular need will doubtless become evident to others skilled in the art, to obtain all or part of the benefits of my invention without copying the process and apparatus shown, and I, therefore, claim all such insofar as they fall within the reasonable spirit and scope of my claims.

Having thus described my invention what I claim as new and desire to secure by Letters Patent is:

1. A food platter having an outer rim and having partitions and provided with a heat sealable, plastic, moisture resistant interior surface which extends without interruption over the interior of the platter and over the rim and partitions, and a cover extending across the food platter in contact with the rim and the upper surfaces of the partitions, having a moisture resistant heat sealable plastic interior surface, the cover being heat sealed to the platter around the rim and along the tops of the partitions, whereby the contents of each partition is hermetically sealed from the contents of the other partitions and from the outside.

2. A food platter having an outer rim and having partitions forming part of the platter, a heat sealable, plastic, moisture resistant liner extending uninterruptedly over the interior of the platter and over the partitions and rim, and a cover extending across the food platter in contact with the rim and the upper surfaces of the partitions, having a moisture resistant heat sealable, plastic, interior surface, the cover being heat sealed to the platter around the rim and along the tops of the partitions, whereby the contents of each partition is hermetically sealed from the contents of the other partitions and from the outside.

References Cited in the file of this patent

UNITED STATES PATENTS

| Number | Name | Date |
|---|---|---|
| 1,196,803 | Mulholland | Sept. 5, 1916 |
| 1,282,552 | Duncan | Oct. 22, 1918 |
| 1,576,088 | Bunz | Mar. 9, 1926 |
| 1,647,289 | Gwinn | Nov. 1, 1927 |
| 1,735,219 | Steele et al. | Nov. 12, 1929 |
| 1,848,066 | Shepard et al. | Mar. 1, 1932 |
| 2,008,659 | Salfisberg | June 16, 1935 |
| 2,073,635 | Holoubek | Mar. 16, 1937 |
| 2,096,825 | Roman | Oct. 26, 1937 |
| 2,102,858 | Schlumbohm | Dec. 21, 1937 |
| 2,211,816 | Heise | Aug. 20, 1940 |
| 2,245,738 | Taylor | June 17, 1941 |
| 2,252,297 | MacIntyre | Aug. 12, 1941 |
| 2,271,156 | Walker | Jan. 27, 1942 |
| 2,353,746 | Moore | July 18, 1944 |
| 2,432,792 | Ovenshire | Dec. 16, 1947 |
| 2,527,919 | Drangle | Oct. 31, 1950 |